(12) United States Patent
Agarwal et al.

(10) Patent No.: US 10,006,828 B2
(45) Date of Patent: Jun. 26, 2018

(54) SYSTEMS AND METHODS FOR MEASURING RESISTIVE SENSORS

(71) Applicant: Apple Inc., Cupertino, CA (US)

(72) Inventors: Manu Agarwal, Cupertino, CA (US); John Stephen Smith, Cupertino, CA (US); Sumant Ranganathan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 14/749,571

(22) Filed: Jun. 24, 2015

(65) Prior Publication Data

US 2016/0377501 A1   Dec. 29, 2016

(51) Int. Cl.
*G01L 25/00* (2006.01)
*G01L 1/22* (2006.01)
*G06F 3/041* (2006.01)

(52) U.S. Cl.
CPC ............ *G01L 25/00* (2013.01); *G01L 1/2281* (2013.01); *G06F 3/0414* (2013.01); *G06F 3/0418* (2013.01)

(58) Field of Classification Search
None
See application file for complete search history.

(56) References Cited

U.S. PATENT DOCUMENTS

| | | | |
|---|---|---|---|
| 4,342,460 A | 8/1982 | Eng | |
| 5,047,952 A * | 9/1991 | Kramer | A61B 5/6806 341/20 |
| 5,159,159 A * | 10/1992 | Asher | G01L 1/205 178/18.05 |
| 5,717,935 A * | 2/1998 | Zanders | G05B 24/02 257/E27.026 |
| 5,915,285 A * | 6/1999 | Sommer | G01L 1/2287 338/2 |
| 6,002,389 A | 12/1999 | Kasser | |
| 6,034,404 A * | 3/2000 | Soares | G01K 7/01 257/415 |
| 6,050,962 A * | 4/2000 | Kramer | A61B 5/1071 600/595 |
| 6,701,296 B1 * | 3/2004 | Kramer | A61B 5/6806 370/545 |
| 7,017,420 B2 | 3/2006 | Kalvesten et al. | |
| 7,536,919 B2 | 5/2009 | Powlesland et al. | |

(Continued)

OTHER PUBLICATIONS

Bau, et al., "TeslaTouch: Electrovibration for Touch Surfaces," UIST'10, Oct. 3-6, 2010, New York, New York USA, 10 pages.

(Continued)

*Primary Examiner* — Paul West
*Assistant Examiner* — Mark A Shabman
(74) *Attorney, Agent, or Firm* — Brownstein Hyatt Farber Schreck, LLP

(57) ABSTRACT

Systems and methods for accurately and precisely measuring the resistance of a resistive sensor of a matched resistive sensor pair disposed on opposite surfaces of a substrate. Certain embodiments include coupled each sensor of the matched resistive sensors to a thermally-isolated pair of reference resistors contained within an integrated circuit so as to form a Wheatstone bridge. A controller associated with the integrated circuit can adjust the resistance of the thermally-isolated pair of reference resistors until the ratio of resistances matches to the ratio of resistances between the sensors of the matched pair.

18 Claims, 10 Drawing Sheets

(56) References Cited

U.S. PATENT DOCUMENTS

| | | | |
|---|---|---|---|
| 7,538,760 B2 | 5/2009 | Hotelling et al. | |
| 7,784,366 B2 | 8/2010 | Daverman et al. | |
| 7,821,506 B2 * | 10/2010 | Sato | G06F 3/03547 178/18.01 |
| 8,248,286 B2 * | 8/2012 | Neagoe | H03M 1/682 324/723 |
| 8,479,585 B2 | 7/2013 | Shaw-Klein | |
| 8,492,238 B2 | 7/2013 | Celik-Butler et al. | |
| 8,686,714 B2 | 4/2014 | Goossens | |
| 8,780,074 B2 | 7/2014 | Castillo et al. | |
| 8,886,334 B2 | 11/2014 | Ghaffari et al. | |
| 9,116,569 B2 | 8/2015 | Stacy et al. | |
| 9,136,459 B2 | 9/2015 | Fujii et al. | |
| 9,246,486 B2 | 1/2016 | Yang et al. | |
| 9,276,191 B2 | 3/2016 | Ando et al. | |
| 9,281,415 B2 | 3/2016 | Bao et al. | |
| 2003/0150276 A1 * | 8/2003 | Christensen | G01G 3/12 73/795 |
| 2003/0160768 A1 | 8/2003 | Tanabe et al. | |
| 2005/0270043 A1 * | 12/2005 | Iacob | G01R 1/203 324/714 |
| 2007/0205777 A1 * | 9/2007 | Walter | G01D 21/00 324/691 |
| 2010/0123686 A1 * | 5/2010 | Klinghult | G06F 3/0412 345/178 |
| 2011/0167972 A1 | 7/2011 | Gilliver et al. | |
| 2012/0188201 A1 * | 7/2012 | Binstead | G06F 3/041 345/174 |
| 2013/0042702 A1 | 2/2013 | Huang et al. | |
| 2013/0082970 A1 | 4/2013 | Frey et al. | |
| 2013/0154998 A1 * | 6/2013 | Yang | H03K 17/9625 345/174 |
| 2014/0338459 A1 | 11/2014 | Besling et al. | |
| 2014/0368455 A1 | 12/2014 | Croisonnier et al. | |
| 2016/0003880 A1 * | 1/2016 | Deschildre | G01C 19/5776 324/705 |
| 2016/0062517 A1 | 3/2016 | Meyer et al. | |
| 2016/0195441 A1 | 7/2016 | Sauers et al. | |
| 2016/0306481 A1 | 10/2016 | Filiz et al. | |
| 2017/0010723 A1 | 1/2017 | Smith et al. | |

OTHER PUBLICATIONS

Feist, "Samsung snags patent for new pressure sensitive touch-screens," posted on AndroidAuthority.com at URL: http://www.androidauthority.com/samsung-patent-pressure-sensitive-touch-screens-354860, Mar. 7, 2014, 1 page.

* cited by examiner

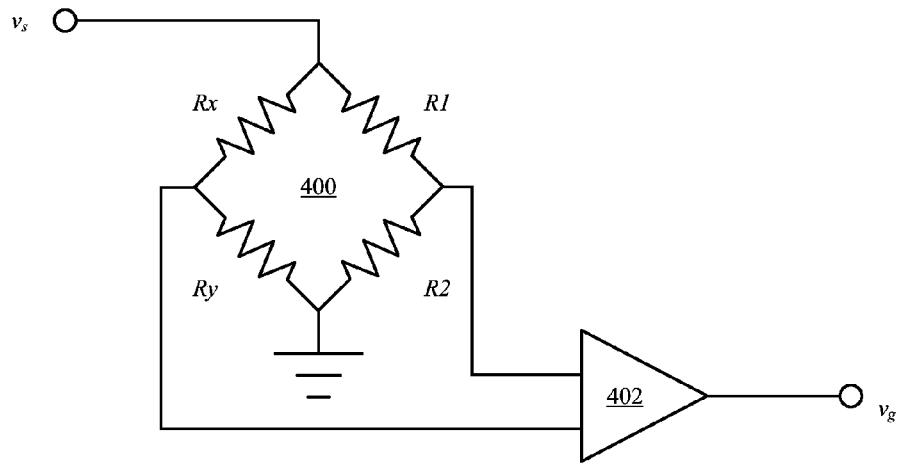
FIG. 4
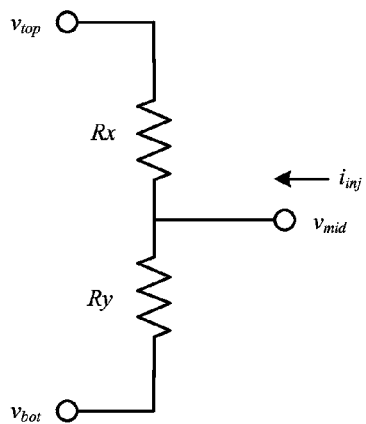 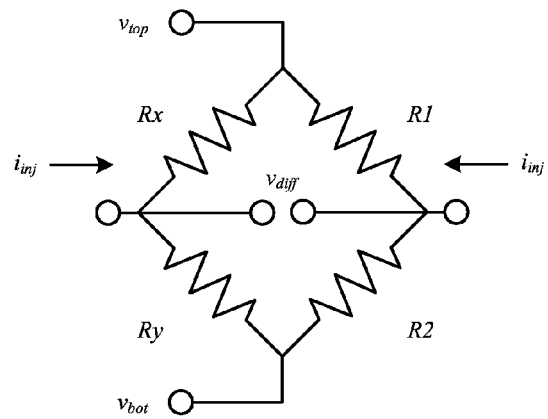
FIG. 5A           FIG. 5B

SYSTEMS AND METHODS FOR MEASURING RESISTIVE SENSORS

TECHNICAL FIELD

Embodiments described herein generally relate to resistive sensors for electronic devices and, more particularly, to systems and methods for reducing thermal and supply-line noise when measuring resistive sensors.

BACKGROUND

An electronic device can include a resistive sensor. For example, a personal electronic device with a display, such as a tablet computer, can include a strain sensor to measure the force with which a user touches the display. In another example, a home accessory, such as a security system, can include a photo-resistive sensor to measure the brightness of light within a room. Other example devices that can include a resistive sensors include cellular telephones, smart phones, personal digital assistants, laptop computers, track pads, wearable devices, health devices, sports accessory devices, peripheral input devices, and so on.

In many cases, materials selected for a resistive sensor can be affected by changes in temperature, which in turn can affect the resistance of the sensor. Thus, any local or global temperature variation within an electronic device can affect the accuracy of any calculations depending upon the determined resistance of the sensor.

In addition, the calculated resistance of a resistive sensor may be affected by power supply noise. For example, resistance can be calculated by applying a known voltage from a power supply across the terminals of a resistive sensor, measuring the current flowing therethrough, and dividing the known voltage by the measured current (Ohm's law). However, noise sources that affect the power supply can also affect the voltage output therefrom, in turn affecting the measured current, which thereafter affects the calculated resistance. Thus, power supply noise, like temperature, can affect the accuracy of any calculations depending upon determined resistance of the sensor.

In still other cases, a resistive sensor may be fabricated with multiple independent resistive strain sensors arranged in a circuit (e.g., voltage divider, Wheatstone bridge). In these examples, manufacturing variations can affect the resistance of the individual resistive strain sensors differently, which in turn can affect measurements of voltage, current, or resistance obtained from the resistive sensor.

Accordingly, there may be a present need for improved systems for measuring resistive sensors that are tolerant to manufacturing variations, power supply noise, and temperature variations.

SUMMARY

Embodiments described herein may relate to, include, or take the form of a force input sensor for use as input to an electronic device.

Embodiments described herein may relate to, include, or take the form of an electronic device including at least an input surface. The input surface can include a substrate with a first and second resistive sensor disposed thereupon. In some embodiments, the first and second resistive sensors can be disposed on opposite surfaces (e.g., top and bottom) of the substrate. The first and second resistive sensors can be formed from a material with a strain-sensitive electrical property, such a resistance.

The electronic device can also include an integrated circuit that itself includes two digitally variable resistors, an addressing controller to couple the first resistive sensor, second resistive sensor, the first digitally variable resistor, and the second digitally variable resistor into a balancing network such as a Wheatstone bridge, and a calibration controller to balance the balancing network. Some embodiments can include a configuration in which the first digitally variable resistor may be positioned physically proximate the second digitally variable resistor within the integrated circuit such that the temperature of the first digitally variable resistor may be substantial equal to the temperature of the second digitally variable resistor.

Embodiments described herein may also relate to, include, or take the form of a method of calibrating a force sensor with a first and second resistive strain sensors arranged on opposite sides of a substrate and electrically coupled as a first voltage divider, the method including at least the operations of coupling a first digitally-controlled resistor to a second digitally controlled resistor as a second voltage divider, coupling the first voltage divider to the second voltage divider to form a balancing network (e.g., Wheatstone bridge), adjusting the resistance of the first digitally-controlled resistor and the resistance of the second digitally-controlled strain sensors until the balancing network may be balanced, and storing the resistance of the first digitally-controlled resistor and the second digitally-controlled strain sensor.

Further embodiments described herein may relate to, include, or take the form of a method of reading a force sensor with a first and second resistive strain sensors arranged on opposite sides of a substrate and electrically coupled as a first voltage divider, the method including at least the operations of coupling a first digitally-controlled resistor to a second digitally controlled resistor as a second voltage divider, coupling the first voltage divider to the second voltage divider to form a balancing network, setting the resistance of the first and second digitally controlled resistor based on a first and second calibration value, and obtaining a measurement of a voltage between nodes of the balancing network.

Other embodiments described herein may relate to, include, or take the form of a method of manufacturing an integrated circuit for measuring changes in a resistive strain sensor pair, the method including at least the operations of determining a resistance and manufacturing tolerance for each resistive strain sensor within the resistive strain sensor pair, forming a first plurality of individual resistors onto a substrate such that the total series resistance of the plurality of individual resistors may be greater than the manufacturing tolerance, forming a first plurality of switching transistors onto the substrate, each switching transistor electrically coupled to a respective one sensor of the first plurality of individual sensors, forming a second plurality of individual resistors adjacent to the first plurality of individual resistors, the second plurality of individual resistors formed onto the substrate such that the total series resistance of the plurality of individual resistors may be greater than the manufacturing tolerance, and forming a second plurality of switching transistors onto the substrate, each switching transistor electrically coupled to a respective one sensor of the second plurality of individual sensors.

BRIEF DESCRIPTION OF THE FIGURES

Reference will now be made to representative embodiments illustrated in the accompanying figures. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

FIG. 4 depicts a simplified schematic diagram of a resistive sensor.

FIG. 5A depicts a simplified schematic signal flow diagram illustrating one method of measuring a resistive sensor.

FIG. 5B depicts another simplified schematic signal flow diagram illustrating another method of measuring a resistive sensor.

The use of the same or similar reference numerals in different figures indicates similar, related, or identical items.

Figure 1:
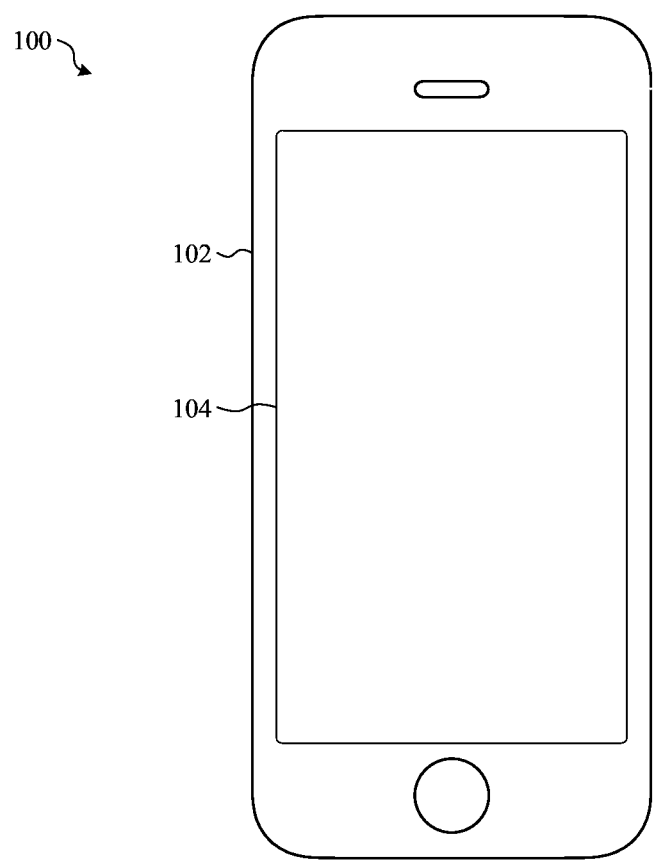
FIG. 1 depicts an example electronic device incorporating a resistive sensor.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalties of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for measuring the resistance of one or more resistive sensors. A resistive sensor can be formed from a material that exhibits a change in electrical resistance (e.g., conductance) in response to an input or an environmental condition such as, but not limited to, changes in light, sound, pressure, movement, compression, tension, or force. In one example, a resistive sensor can be formed from a material that is sensitive to light. In another example, a resistive sensor can be formed from a material that is sensitive to strain ("resistive strain sensor").

For example, a pair of resistive strain sensors can be arranged proximate to one another on a surface of a substrate and connected to an electrical circuit in order to approximate a magnitude of strain (e.g., compression or tension) experienced by the substrate. In this example, a magnitude of strain can be obtained by measuring either a common property (e.g., parallel and/or series resistance) or a differential property (e.g., voltage division) of the pair of resistive strain sensors.

In one embodiment, a common property measurement such as parallel resistance can be obtained by applying a known voltage to the circuit and measuring a current through the parallel resistive strain sensors. In another embodiment, a current can be injected into the resistive strain sensors and a voltage can be measured therefrom. In either case, the resistance of either or both resistive strain sensors can be calculated via Ohm's law and can, in turn, be correlated to an amount of strain experienced by one or both sensors.

In another embodiment, the two resistive strain sensors can be electrically coupled together such that a differential property measurement (such as voltage division) can be obtained by applying a known voltage to the circuit and measuring a voltage across a point between the resistive sensors and a reference voltage. In another embodiment, a current can be injected into the resistive strain sensors and a voltage, or more than one voltage, can be measured. In either case, the resistance of either or both resistive strain sensors can be calculated via Ohm's law and can, in turn, be correlated to an amount of strain experienced by one or both resistive strain sensors.

In many cases, differential property measurements can be combined with or compared to common property measurements. In some examples, the differential property measurement and common property measurement can be combined by unweighted or weighted averaging. In other embodiments, the maximum or minimum of the two measurements can be used. In still further examples, other methods of combining or deciding between the two measurements can be used.

In other cases, an actual calculation of resistance for each independent resistive strain sensor may not be required. For example, in certain embodiments, a measured voltage or current (e.g., from a common property measurement, differential property measurement, or both) can be correlated directly to an amount of strain experienced by one or both resistive strain sensors.

Once the resistances of each resistive strain sensor is obtained via calculation or measurement, each can be compared to a known baseline resistance value in order to determine whether either or both of the resistive strain sensors are experiencing tension or compression. In other words, when the substrate experiences an application of force, it may deform, causing one or both of the resistive strain sensors to either expand (e.g., tension) or contract (e.g., compression), which can cause the resistance of one or both of the resistive strain sensors to change in a mathematically predictable manner.

For example, for certain materials, resistance can change linearly with compression or tension. For other materials, resistance can change following a known curve in response to compression or tension. Accordingly, depending upon the material selected for the resistive strain sensors, a particular resistance can be correlated to a particular amount of strain experienced by a particular resistive sensor, which in turn can itself be correlated to an amount of force applied to the substrate.

However, some materials selected for a resistive sensor can be affected by changes in temperature, which in turn can affect the measured resistance of that sensor. As a result, any resistance measurement or strain calculation based on the determined resistance of the resistive strain sensors may be unreliable, imprecise, or inaccurate depending upon local or global temperature variations.

In addition, conventional voltage and current supplies that may be used for supplying the voltage or current necessary for measuring the resistance of resistive sensors may be susceptible to and/or may generate noise. As a result, any resistance measurement or strain calculation based on the voltage or current output by the supply may be unreliable, imprecise, or inaccurate.

Also, individual resistive strain sensors, as manufactured, may have a slightly different baseline resistance than expected. In such cases, the results of common property and/or differential property measurements may be skewed in an unknown direction. As a result, any strain calculation based on the determined resistance of the resistive strain sensors may be unreliable, imprecise, or inaccurate.

Accordingly, many embodiments described herein relate to improved systems for measuring resistive sensors that are tolerant to manufacturing variations, power supply noise, and temperature variations.

Many embodiments described herein include an integrated circuit for calibrating to a resistive strain sensor prior to obtaining a measurement therefrom. The integrated circuit can include one or more digitally-controlled resistors that can be coupled to a pair of resistive strain sensors into, in one example, a Wheatstone bridge configuration. Prior to measuring any differential or common properties of the Wheatstone bridge, the integrated circuit can be calibrated, for example by matching the resistances of each of the pair of resistive strain sensors. In another example, the integrated circuit can be calibrated by matching the ratio of a first resistor within the integrated circuit to a first strain sensor of a pair of resistive strain sensors to the ratio of a second resistor within the integrated circuit to a second strain sensor. For example, one digitally-controlled resistor can be associated with one of the two resistive strain sensors and a second digitally-controlled resistor can be associated with the second of the two resistive strain sensors. Accordingly, it may be appreciated that the terms "matching", "matched", "balancing" and "balanced," as used herein when referring to balancing network circuit topologies including a Wheatstone bridge configuration, generally refer to both directly matched resistances (e.g., direct balancing) of one or more resistors and also to proportionally matched resistances (e.g., proportional balancing) of one or more resistors. In this manner, these and related terms refer generally to resistances that cause the Wheatstone bridge to become balanced, regardless whether such balancing is the result of resistance matching or resistance ratio matching.

Once the resistors within the integrated circuit balance the Wheatstone bridge formed therewith, any noise within the voltage or current source driving the bridge may be eliminated as common mode noise. Similarly, once the Wheatstone bridge is balanced, any effects of manufacturing differences within the resistive strain sensors are functionally offset. More particularly, any effects of manufacturing differences are balanced out when the respective digitally-controlled resistor is matched (either proportionally or directly) to the mis-manufactured sensor.

Furthermore, by including the digitally-controlled resistors within a single integrated circuit, individual resistors can be placed very physically proximate one another. Thus, the temperature of each digitally-controlled resistor may be substantially uniform, mitigating any effects of temperature variation therein.

In many embodiments, a digitally-controlled resistor can be formed within the integrated circuit as a resistor ladder. In some embodiments, the resistor ladder can include a number of high-precision resistors that each are coupled to a digital switch such as a transistor. In some embodiments, the high-precision resistors can be arranged in series. In other embodiments, the high-precision resistors can be arranged in parallel. In still further embodiments, another arrangement of the high precision resistors can be used.

In many examples, an integrated circuit such as described herein can include digitally-controlled resistors that are physically arranged in adjacent pairs of high-precision resistors. For example, a first high-precision resistor of a first digitally-controlled resistor can be physically laid out adjacent to a first high-precision resistor of a second digitally-controlled resistor. In this way when the first and second digitally-controlled resistors are coupled to a pair of resistive strain sensors, the first and second digitally-controlled resistors can be as close to the same temperature as possible.

In many embodiments, each digitally-controlled resistor can be constructed based, at least in part, on the manufacturing tolerances expected of the process used to form the resistive strain sensors. For example, if a resistive strain sensor is known to have a manufacturing specification of 50 KΩ±10%, a digitally-controlled resistor can be constructed to provide a selectable resistance between at least 45Ω and 55Ω. In some embodiments, the range of a digitally-controlled resistor can be chosen to be wider than the maximum expected manufacturing variation. For example, the digitally-controlled resistor from the example above could be selected to provide a selectable resistance between 40Ω and 60Ω.

In other embodiments, a digitally-controlled resistor can be used in series with an off-chip high precision resistor that provides the bulk of the resistance for matching to a resistive strain sensor. For example, an off-chip bulk resistor can be 40Ω, and the on-chip digitally-controllable resistor can provide 5 to 15Ω of resistance, for a total series resistance of 45Ω to 55Ω. In some embodiments, an off-chip bulk resistor may be favored over an entirely integrated circuit embodiment. For example, an off-chip bulk resistor of high-precision resistor may be less expensive to manufacture.

In still further embodiments, more than one resistive strain sensor pair can be coupled to the same integrated circuit. For example, a plurality of resistive strain sensors pairs can be arranged in an array. An addressing controller can be coupled to each of the resistive strain sensor pairs in the array and can couple one resistive strain sensor pair at a time to the integrated circuit. After a strain measurement is obtained from the resistive strain sensor, another resistive strain sensor can be selected. In this manner, each resistive strain sensor of the plurality of resistive strain sensors can be measured in sequence.

FIG. 1 depicts an example electronic device 100 incorporating a number of resistive sensors arranged in an array. The electronic device 100 may include a display 104 disposed within a housing 102. The display 104 may be any suitable display element that may include a stack of multiple layers including, for example, a liquid crystal display (LCD) layer, a cover glass layer, a touch input layer, and so on.

In many examples, each of the layers of the display 104 may be adhered together with an optically transparent adhesive. In some embodiments, each of the layers of the display 104 may be attached or deposited onto separate substrates that may be laminated or bonded to each other. The display stack may also include other layers for improving the structural or optical performance of the display, including, for example, a cover glass sheet, polarizer sheets, color masks, and the like. Additionally, the display stack may include a touch sensor for determining the location of one or more touches on the display 104 of the electronic device 100.

In many cases, the electronic device 100 can include a processor, memory, power supply and/or battery, network connections, sensors, input/output ports, acoustic elements, haptic elements, digital and/or analog circuits for performing and/or coordinating tasks of the electronic device 100, and so on. For simplicity of illustration, the electronic device 100 is depicted in FIG. 1 without many of these elements, each of which may be included, partially and/or entirely, within the housing 102. Furthermore, although illustrated as a cellular phone, the electronic device 100 can be another electronic device that is either stationary or portable, taking a larger or smaller form factor than illustrated. For example, in certain embodiments, the electronic device 100 can be a laptop computer, a tablet computer, a cellular phone, a wearable device, a health monitoring device, a home or building automation device, a home or building appliance, a craft or vehicle entertainment, control, and/or information system, a navigation device, and so on.

The electronic device 100 can also include a force input sensor coupled to the display 104. For simplicity of illustration, as with the example elements of electronic device 100 listed above, FIG. 1 is depicted without the force input sensor which may be included, partially and/or entirely, within the housing 102. By coupling the force input sensor to the display 104, the electronic device 100 can determine a magnitude of force applied to the display 104. For example, a force can be applied to the display by a user's finger, a stylus, or another object.

As a result of data received from the force input sensor, force location and magnitude can be used as an input to the electronic device 100. For example, a high-magnitude force input may be interpreted differently than a low-magnitude force input event. For example, a smart phone may unlock a display screen with a high-magnitude force input event and may pause audio output for a low-magnitude force input event. The response or output of the electronic device 100 may differ in response to the two inputs, even though the inputs occur at the same point on the display 104.

In other examples, a change in force may be interpreted as an additional type of input event ("force gesture"). For example, a user may forcibly press a series of pulses into the display in order to unlock the electronic device 100. In another example, a user may hold the electronic device 100 close to an artery in order to evaluate blood pressure or heart rate.

As noted above, in many examples, the force input sensor may be incorporated within the display 104 of the electronic device 100. In other examples, the force input sensor can be incorporated into the display stack that includes the display 104. In still further examples, the force input sensor can be disposed below the display stack, or can be laminated within a cover glass disposed above the display 104.

In many of these embodiments, the force input sensor may be formed from an optically transparent material or may be formed in an optically transparent manner, so as to not interfere with the operation of the display 104. For example, in some embodiments, the force input sensor can be formed from an optically clear and electrically conductive material such as Indium Tin Oxide ("ITO"). In other examples, the force input sensor can be formed from an optically opaque material in an optically transparent manner. For example, in certain embodiments, silver nanowires can be disposed on a substrate in such a manner so as to be invisible to a user from beyond certain distances.

Additionally, the force input sensor may be formed from a material or formed into a structure, such that upon application of a force (e.g., compression, expansion, tension, strain), one or more electrical properties of the material or structure can measurably change. Force-sensitive electrical properties can include conductance, accumulated charge, inductance, magnetic field strength, electrical field strength, capacitance, and so on. For example, a force-sensitive element formed from a piezoelectric material can accumulate charge in response to an applied force.

In another example, a force-sensitive element can be formed as a structure (such as a number of layered materials) having a capacitance that measurably varies with force. In another example, a force-sensitive element can be formed from a strain-sensitive material that may measurably change in conductance (e.g., resistance) in response to elastic deformation resulting from application of a force. In these and some embodiments, a known relationship (e.g., linear, exponential, and so on) between the electrical property or properties and force applied can be used to determine an amount of force applied to force input sensor.

For example, in certain embodiments a force input sensor can be formed from a plurality of resistive sensors arranged in an array and coupled to the surface of a rigid substrate such as glass. When the substrate receives a force, the substrate may undergo an elastic deformation (however slight) causing the substrate to experience a bending strain that, in turn, causes at least one of the resistive strain sensors to exhibit a change in resistance. This resistance can be measured with an electrical circuit.

As noted above, in many embodiments, the resistive strain sensors may be arranged on the substrate in aligned pairs disposed on opposite sides of the substrate. In some cases, the resistive strain sensor may be patterned into distinct elements, each element including a series of traces generally oriented along one direction.

In general, in this configuration, the resistive strain sensors may be composed of a material whose resistance changes in a known fashion in response to strain. For example, some materials may exhibit a change in resistance linearly in response to strain. Other materials may exhibit a change in resistance logarithmically in response to strain. Still further materials may exhibit a change in resistance in a different manner. For example, the change in resistance may be due to a change in the geometry resulting from the applied strain such as an increase in length combined with decrease in cross-sectional area may occur in accordance with Poisson's effect. The change in resistance may also be due to a change in the inherent resistivity of the material due to the applied strain. For example, the applied strain may make it easier or harder for electrons to transition through the material.

In these embodiments, the resistive strain sensors can be formed by coating the substrate with a transparent conductive material or otherwise depositing such a material on the substrate. Suitable transparent conductive materials include, for example, gallium-doped zinc oxide, polyethyleneioxythiophene (PEDOT), indium tin oxide (ITO), carbon nanotubes, graphene, silver nanowire, nickel nanowires, other metallic nanowires, and the like. Potential substrate materials include, for example, glass, sapphire, plastic or transparent polymers like polyethylene terephthalate (PET) or cyclo-olefin polymer (COP).

In certain embodiments, an optically transparent resistive strain sensor may not be required. For example, the force input sensor can be disposed below the display 104 in certain embodiments. In these embodiments, other materials may be used, including, for example, nickel, Constantan and Karma alloys for the conductive film and a polyimide may be used as a substrate. Other semiconductor materials may be used for other nontransparent embodiments such as, but not limited to, silicon, polysilicon, gallium alloys, and so on.

As noted above, the resistances of the resistive strain sensors may be measured by the electronic device 100 using an electronic circuit. In some examples, the electronic circuit can include a balancing network, such as a Wheatstone bridge configuration. For example, the electronic device can couple to a pair of resistive strain sensors a pair of reference resistors R1 and R2 of known resistance to complete the Wheatstone bridge configuration. Thereafter, a supply voltage Vs can be applied across the bridge and a voltage Vg may be measured across the midpoints of the bridge. In many examples, the pair of resistive strain sensors can be designed to be matched (e.g., exhibiting the same resistance) under no-load conditions and can be denoted as Rx and Ry.

In these embodiments, Rx and Ry may be positioned proximate to one another such that both Rx and Ry experience the same or substantially the same strain when a force is supplied to the force input sensor. Similarly, because of the close positioning of Rx and Ry, any changes in resistance as a result of ambient or local temperature variation will affect each Rx and Ry substantially equally.

Accordingly, when under normal operating no-load conditions, the Wheatstone bridge is in balance and functionally no voltage should be read when measuring Vg. If, however, a voltage Vg is measured, the electronic device 100 can determine that a force is applied to the display 104, and in turn to the force input sensor. By comparing Vg to the s, the strain experienced collectively by the resistive strain sensors Rx and Ry can be determined. Furthermore, if the relationship between electrical resistance and mechanical strain of the material selected for the resistive strain sensor is known, the strain ε as a function of the change in resistance may be directly calculated.

However, as noted above, changes in temperate, manufacturing variations, and voltage supply noise can all cooperate to interfere with the accuracy and precision of any strain measurement derived from the resistance measurement(s) of the resistive strain sensors. More specifically, changes in temperature may cause R1, R2, Rx, and Ry to exhibit resistance(s) that are more influenced by temperature than strain. Additionally, manufacturing variations in R1, R2, Rx, or Ry can cause the Wheatstone bridge configuration to become imbalanced during loaded or non-loaded conditions. Additionally, voltage supply noise in Vs can cause the voltage measurement Vg to increase or decrease, even without changes in force applied to the force input sensor.

Accordingly, in some embodiments, the force input sensor may be constructed in such a way so as to mitigate the effects of noise resulting from temperature changes. For example, each time a user touches the touch screen, the user may locally increase the temperature of the screen and resistive strain sensor nearby. In other examples, different environments (e.g., indoors or outdoors) may subject the electronic device to different ambient temperatures. In still further examples, an increase in temperature may occur as a result of heat produced by components within of the electron device 100.

In these embodiments, the substrate may be selected (at least in part) for the substrate's thermal conductivity. For example, a substrate of many embodiments may have a high thermal conductivity. In these embodiments, the temperature of each sensor within an aligned pair of resistive strain sensors can be at the same temperature. In this manner, and because the pair of resistive strain sensors are similarly designed, changes in temperature will affect each sensor in substantially the same way, substantially mitigating the effects of temperature changes.

To mitigate the effects of noise in the voltage supply and to mitigate effects resulting from manufacturing variances, the force input sensor may be coupled to an integrated circuit. For simplicity of illustration, as with the example elements of electronic device 100 listed above, FIG. 1 is depicted without the integrated circuit which may be included, partially and/or entirely, within the housing 102.

In many embodiments, the integrated circuit can calibrate to a resistive strain sensor prior to obtaining a measurement therefrom. For example, as noted above, the integrated circuit can include one or more digitally-controlled resistors that can be coupled to a selected pair of resistive strain sensors into a Wheatstone bridge configuration.

Prior to measuring any differential or common properties of the Wheatstone bridge, the integrated circuit can be calibrated to match the resistances of each of the pair of resistive strain sensors. Continuing the example presented above, R1 and R2 can be digitally-controlled resistors within the integrated circuit that can be configured to match the resistances of Rx and Ry respectively.

Once the resistors R1 and R2 within the integrated circuit match (either proportionally or directly) to the values of the pair of the resistive strain sensors Rx and Ry (e.g., are calibrated), the Wheatstone bridge formed therewith is balanced, exhibiting functionally zero voltage between the midpoints of the bridge under no-load conditions. As a result, any noise within the voltage or current source driving the bridge may be eliminated as common mode noise.

Similarly, once the resistors R1 and R2 within the integrated circuit match to the values of the pair of resistive strain sensors Rx and Ry, any effects of manufacturing differences within the resistive strain sensors Rx and Ry are functionally offset. More particularly, any effects of manufacturing differences are balanced out when the respective digitally-controlled resistors R1 and R2 are matched (either proportionally or directly) to the mis-manufactured sensors Rx and Ry. More specifically, as noted above, in some embodiments, the digitally-controlled resistors R1 and R2 can be matched directly to the sensors Rx and Ry or, in other embodiments, the digitally-controlled resistors R1 and R2 can be proportionally matched to the sensors Rx and Ry. For example, the ratio of the resistance of the digitally-controlled resistor R1 to the resistance of the sensor Rx can be matched to the ratio of the resistance of the digitally-controlled resistor R2 to the resistance of the sensor Ry.

Furthermore, by including the digitally-controlled resistors R1 and R2 within a single integrated circuit, the resistors can be placed very physically proximate one another. Thus, the temperature of each digitally-controlled resistor may be substantially uniform, mitigating any effects of temperature variation within the digitally-controlled resistors.

In many embodiments, a digitally-controlled resistor can be formed within the integrated circuit as a resistor ladder. In some embodiments, the resistor ladder can include a number of high-precision resistors that each are coupled to a digital switch such as a transistor. In order to select a particular resistance for the digitally-controlled resistor, an appropriate transistor may be switched on by the electronic device 100.

Figure 2A:
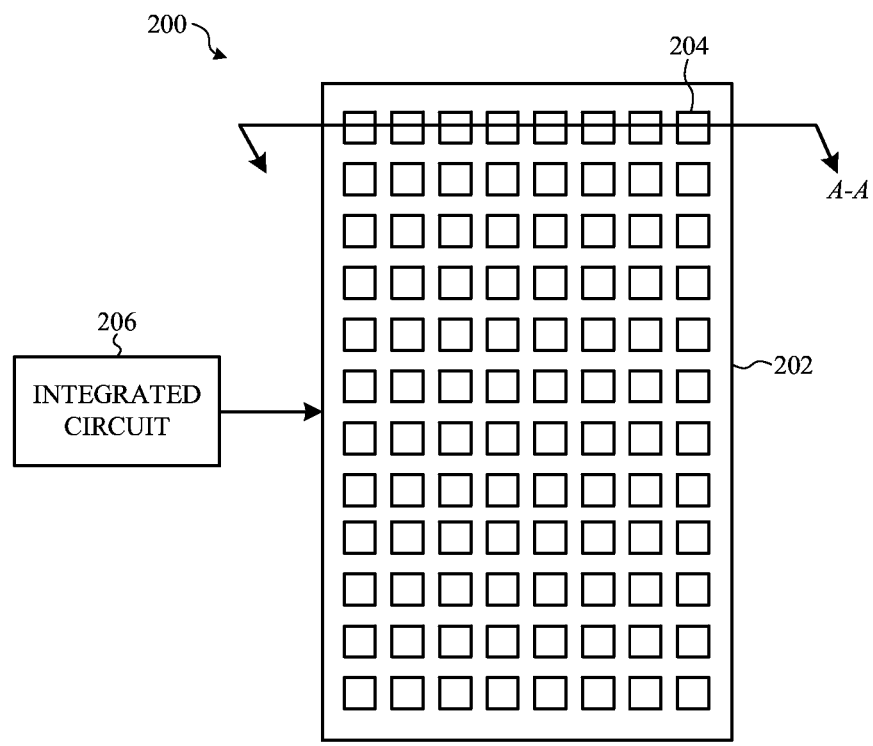
FIG. 2A depicts a top view of an example resistive sensor array arranged as a force input sensor including a grid of optically transparent resistive strain sensors.

FIG. 2A depicts a top view of an example resistive sensor array arranged as a force input sensor 200 including a grid of ninety-six resistive strain sensors, each identified as a resistive strain sensor 204. The force input sensor 200 includes a substrate 202 having disposed upon it a plurality of independent resistive strain sensors 204. Each of the resistive strain sensors 204 can be coupled to an integrated circuit 206.

In this example, the substrate 202 may be an optically transparent material, such as polyethylene terephthalate (PET). The resistive strain sensors 204 may be made from transparent conductive materials include, for example, polyethyleneioxythiophene (PEDOT), indium tin oxide (ITO), carbon nanotubes, graphene, silver nanowire, other metallic nanowires, and the like. In certain embodiments, the resistive strain sensors 204 may be selected at least in part on temperature characteristics. For example, the material selected for the resistive strain sensors 204 may have a negative temperature coefficient of resistance such that, as temperature increases, the resistance decreases.

In this example, the resistive strain sensors 204 are formed as an array of rectangular elements, although other shapes and array patterns could also be used. In many examples, each individual resistive strain sensor 204 may have a selected shape and/or pattern. For example, in certain embodiments, the resistive strain sensor 204 may be deposited in a serpentine pattern. The resistive strain sensor 204 may include at least two electrodes for connecting to a sensing circuit. In other cases, the resistive strain sensor 204 may be electrically connected to sense circuitry, such as the integrated circuit 206, without the use of electrodes. For example, the resistive strain sensor 204 may be connected to the integrated circuit 206 using conductive traces that are formed onto the substrate 202.

Figure 2B:
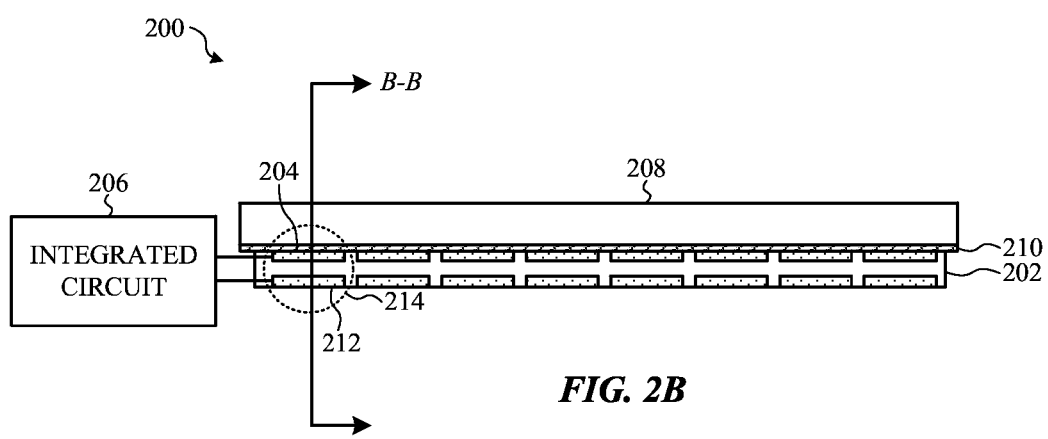
FIG. 2B depicts a side view of a portion of the example resistive sensor array of FIG. 2A taken along line A-A.

FIG. 2B depicts a side view of a portion of the example resistive sensor array of FIG. 2A taken approximately along line A-A. As depicted in this cross-section, a substrate 202 may be disposed below a force-receiving surface 208. The force-receiving surface 208 may be comprised of a material such as glass or sapphire. In some embodiments, the force-receiving surface 208 may be another layer within a display stack, such as a cover glass element. The force-receiving surface 208 may be made from a material having high strain transmission properties. In other words, the force-receiving surface 208 may be made from a hard or otherwise rigid material such as glass or metal such that a force received may be effectively transmitted through the force-receiving surface 208 to the layers disposed below.

Between the force-receiving surface 208 and the substrate 202 (and the plurality of independent resistive strain sensors 204 disposed thereon) can be an adhesive layer 210. The adhesive layer 210 can be used to affix the substrate 202 to the force-receiving surface 208. In other embodiments, the adhesive layer 210 may not be required; the force-receiving surface 208 and the substrate can be mechanically coupled using other suitable methods.

As illustrated in FIG. 2A, a number of resistive strain sensors 204 can be disposed onto (or into) a top surface of the substrate 202. Similarly, on a bottom surface of the substrate 202, a second number of resistive strain sensors 212 can be disposed, axially aligned with the resistive strain sensors 204 such that each resistive strain sensor 212 is paired with a respective one resistive strain sensor 204. In this manner, a number of resistive strain sensor pairs are formed.

In many embodiments, the individual resistive strain sensors of a pair of resistive strain sensors 214 may be manufactured to be substantially identical. For example, the resistive strain sensor 204 may be made from the same material as the resistive strain sensor 212. Additionally, the resistive strain sensor 204 can be formed into the same pattern, or may take the same geometry as the resistive strain sensor 212. In this manner, the resistive strain sensors 204, 212 may be substantially and functionally identical. As a result, the resistive strain sensor pair may be referred to as a matched pair 214.

The matched pair 214 is typically connected to the integrated circuit 206. In this example, the integrated circuit 206 may be configured to detect changes in the resistance of the resistive strain sensors 204, 212, which can be used to estimate a force that is applied to the force input sensor 200. In some cases, the integrated circuit 206 may also be configured to provide information about the location of the touch based which matched pair 214 or resistive strain sensor pairs are experiencing strain.

The integrated circuit 206 may be adapted to determine a difference between a strain experienced by the resistive strain sensor 204 and the strain experienced by the resistive strain sensor 212. For example, the matched pair 214 can be electrically coupled by the integrated circuit 206 so as to measure either a common property (e.g., parallel and/or series resistance) or a differential property (e.g., voltage division) of the pair of resistive strain sensors 214.

For example as described herein, a common property measurement such as parallel resistance can be obtained the integrated circuit 206 by applying a known voltage (e.g., Vs) to the matched pair 214 and thereafter measuring the resulting current. In another embodiment, a current can be injected into the matched pair and a voltage can be measured instead. In some embodiments, an alternating current (with correspondingly alternating voltage) can be applied.

In these examples, the resistance of either or both resistive strain sensors 204, 212 can be calculated via Ohm's law which, in turn, be correlated to an amount of strain experienced by one or both sensors.

In another embodiment, the two resistive strain sensors 204, 212 can be electrically coupled together such that a differential property measurement can be obtained. For example, the integrated circuit 206 can couple two additional reference resistors R1 and R2 (not illustrated) to matched pair 214 so as to form a Wheatstone bridge configuration. Thereafter, a known voltage can be applied to the bridge and, a voltage between the midpoints of the bridge can be measured.

As noted above, the resistances of each resistive strain sensor 204, 212 should be identical under normal no-load conditions (e.g., baseline resistance), as a result of the matching of the sensors within the pair.

However, when a force is applied to the force-receiving surface 208, the amount of strain experienced by the resistive strain sensor 204 may be greater than the amount of strain experienced by the resistive strain sensor 212. In many embodiments, the difference in strain experienced by each resistive strain sensor may be substantial. Similarly, the difference in change in resistance of each resistive strain sensor may also be substantial.

For many embodiments, the amount of strain and therefore the amount of change in resistance for resistive strain sensors positioned on the bottom surface of the substrate 202 may be negligible. As a result, the resistive strain sensor 212 can be considered by the integrated circuit 206 as another resistor within the Wheatstone bridge having a known resistance (e.g., baseline resistance). Accordingly, when the integrated circuit 206 couples the matched pair 214 to the reference resistors R1 and R2, the only unknown resistance is the resistance of the resistive strain sensor 204, which can be calculated via Kirchhoff's current law.

One may appreciate that in this configuration, the resistive strain sensor 212 does not function as a strain sensor as such, but instead serves as a reference resistor for measuring the resistance of the resistive strain sensor 204. In other words, as noted above, the resistive strain sensor 212 may be configured as a strain sensor, formed from a strain-sensitive material, and positioned below the resistive strain sensor 204, only to match the environmental response of the corresponding resistive strain sensor 204. More specifically, by utilizing the matched resistive strain sensor 212 in lieu of a third reference resistor in the Wheatstone bridge configuration, environmental variables (e.g., temperature, humidity, etc.) that might change the resistance of the resistive strain sensor 204 will equally change the resistance of the resistive strain sensor 212.

Accordingly, in one example, as temperature changes, the resistance of the resistive strain sensor 204 and the resistive strain sensor 212 changes at the same rate, functionally cancelling any effects that the temperature change might impart to a subsequent strain measurement.

For example, because the resistance of the resistive strain sensor 204 and resistive strain sensor 212 can each change in response to strain and in response to temperature, the resistance of either element may be calculated as a function of both strain and as a function of temperature, using as a simplified example, the equation:

$$R_{measured} \approx R_{baseline}(1+\alpha \cdot T_{actual})(1+g \cdot \varepsilon_{applied}) \quad \text{Equation 1}$$

The approximation described by Equation 1 notes that the measured resistance of either resistive strain sensor 204 or resistive strain sensor 212 may be affected by the both temperature and strain applied to the material. For example, without strain applied (e.g., $\varepsilon_{applied}=0$), the measured resistance of either sensor may be affected by temperature only.

As noted in Equation 1, the effects of temperature changes may be approximated by the product of the temperature coefficient of resistance a of the material selected for the resistive strain sensor, and the actual temperature $T_{actual}$ of the element. Similarly, the effect of strain may be approximated by the product of the strain coefficient of resistance g and the strain applied $\varepsilon_{applied}$ to the element.

By substituting known quantities $R_{baseline}$, $\alpha$, and g, the strain applied to each element $\varepsilon_{204}$ and $\varepsilon_{212}$ and the actual temperature of each element $T_{204}$ and $T_{212}$ are the only remaining unknown variables, which may be further simplified as a difference in strain $\Delta\varepsilon$ between the matched pair 214 and a difference in temperature $\Delta T$ between the matched pair 214.

Accordingly, as described above the fact that the substrate 202 substantially normalizes the temperature between the matched pair 214, the difference in temperature $\Delta T$ may be functionally approximated as zero. Similarly, the fact that the strain experienced by the bottom-surface resistive strain sensor, the resistive strain sensor 212, is exceptionally low, the strain $\varepsilon_{212}$ may also be functionally approximated as zero. In this manner, the only remaining unknown is the strain $\varepsilon_{204}$ as experienced by the resistive strain sensor 204. Accordingly, once a voltage measurement is obtained by the integrated circuit 206, and the Wheatstone bridge configuration is solved for the resistance of the resistive strain sensor 204, the strain applied to the resistive strain sensors 204, $\varepsilon_{204}$, may be solved for and passed to the electronic device 100 (see, e.g., FIG. 1) as a strain measurement, which in turn can be correlated to a magnitude of force applied to the electronic device.

Figure 3A:
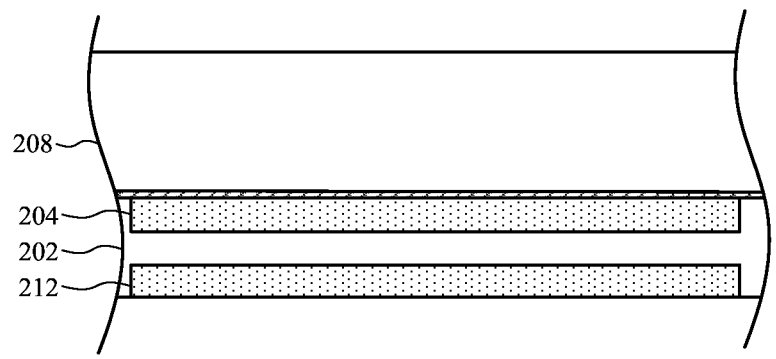
FIG. 3A depicts an enlarged detail side view of one resistive sensor of the example resistive sensor array of FIG. 2B taken along line B-B.
Figure 3B:
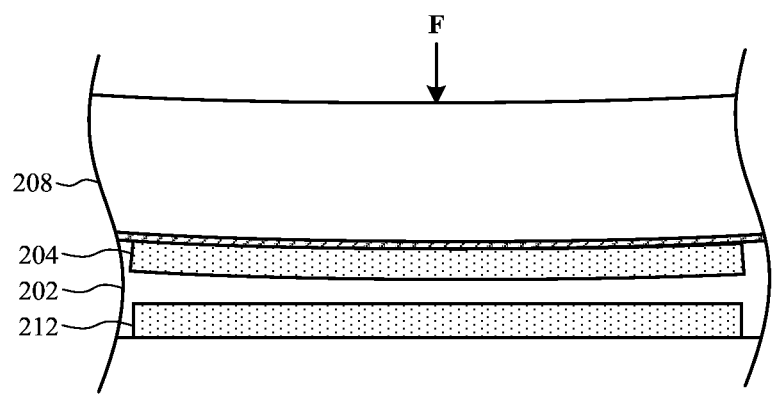
FIG. 3B depicts an enlarged detail side view of one resistive sensor of the example resistive sensor array of FIG. 2B taken along line B-B, deformed in response to an applied force.

FIG. 3A depicts an enlarged detail side view of one resistive sensor of the example resistive sensor array of FIG. 2B taken along line B-B. As shown, a resistive strain sensor 204 is disposed along a bottom surface of the substrate 202, which itself is adhered or otherwise affixed to a bottom surface of a force-receiving surface 208. Facing the first resistive strain sensor 204 is a second resistive strain sensor 212 coupled to the bottom surface of the substrate 202. When a force F is received at the force-receiving surface 208, the substrate 202 and the resistive strain sensor 204 may at least partially deflect, as shown for example in FIG. 3B. As noted above, the resistive strain sensor 212 may not deflect in response to the force F.

FIG. 4 depicts a simplified signal flow diagram of a strain sensor in the form of a Wheatstone bridge 400. In such an embodiment, a voltage Vg may be measured across the output of two parallel voltage dividers connected to a voltage supply Vs by an amplifier 402. In some embodiments, the amplifier 402 can be a programmable gain amplifier (PGA"). One of the voltage dividers of the Wheatstone bridge 400 may include two resistors of known resistance, R1 and R2 and the other voltage divider may include two strain-sensitive resistors Rx and Ry that model the matched pair 214 as shown, for example, in FIGS. 2A-3. As noted above, the voltage Vg measured from the midpoints of the bridge can be used to solve for the resistance of either or both unknown resistors Rx or Ry.

FIG. 5A depicts a simplified signal flow diagram of a resistive strain sensor for use with a force input sensor in the form of a voltage divider. In such an embodiment, a voltage $V_{top}$ may be applied through the resistance of the matched pair 214, illustrated as resistor Rx and Ry. By measuring the voltage out $V_{mid}$, the common property of resistance of the matched pair 214 can be measured by, for example, injecting a current into the midpoint of the voltage divider.

FIG. 5B depicts a simplified signal flow diagram of another temperature-compensating and strain sensor in the form of a Wheatstone bridge. As with other Wheatstone embodiments described herein, two reference resistors of known resistance R1 and R2 can be coupled to two sensing resistors, such as the matched pair 214, illustrated as resistor Rx and Ry. By measuring the voltage $V_{diff}$ across the midpoints of the bridge, the differential property of comparative voltage division of the matched pair 214 and the reference resistors R1 and R2 can be measured.

In other embodiments, alternating current modulation of the voltage and current can be used to measure the voltage divider and the parallel resistance of a Wheatstone bridge configuration, such as illustrated in FIG. 5B. As shown, an alternating current $I_{injected}$ can be injected at the $V_{mid}$ node into the Wheatstone bridge at a first frequency w1 while an alternating voltage V can be placed across the strain sensitive Wheatstone bridge at a second frequency w2. Thereafter, a time-varying voltage can be measured between $V_{mid}$ and a reference point such as circuit ground. The time-varying current and voltage signals may permit both common property measurements and differential property measurements to be obtained substantially simultaneously.

For example, the magnitude of the response at w2, which corresponds to the parallel impedance of the resistors, can be used to increase the accuracy of the measured resistance obtained from the differential voltage magnitude at w1. For example, the parallel impedance of the two resistors may be a function of both temperature and applied force, with changes in temperature correlated to larger changes in parallel impedance and changes in applied force correlated to smaller change in parallel impedance.

Further, as noted above, if the temperature of the matched pair 214 is substantially equal, the differential voltage $V_{diff}$ may not be affected by changes in temperature of the force input sensor. However, if the resistive strain sensors of the matched pair 214 are not closely thermally coupled, or if the materials are not identical or substantially identical in their temperature response (e.g., are not closely matched), the differential voltage $V_{diff}$ may change as a function of temperature. In other words, the materials of the resistive strain sensors of many embodiments described herein may be selected so that matched pairs of strain sensors share at least one thermal property. For example, materials with the same coefficient of thermal expansion can be selected. In other embodiments, other thermal properties can be shared. In still further embodiments, more than one thermal property can be shared between the strain sensors.

In many embodiments, a current proportional to the injected current can be injected into the resistors of known resistance R1 and R2. The proportional current can prevent, mitigate, or reduce other noise sources such as common-mode noise and timing jitter (between current injection and sampling, and so on).

However, as noted above, the calculated resistance of a resistive sensor may also be affected by power supply noise. For example, certain embodiments may obtain a resistance measurement of a resistive strain sensor by injecting a known current into the resistor and measuring a voltage across that resistor. Thereafter, the resistance of the resistor can be obtained through Ohm's law.

However, if the current supplied by the power supply contains noise, then the actual current supplied during measurement of the voltage across the resistive strain sensor may be affected. For example, if the current supplied is 1.0 A±0.1 A (e.g., 10%), and the voltage across the resistive strain sensor is 1.5 volts, the expected resistor value may be 1.5Ω. However, as a result of the error within the current supply, the measured resistance may fall within 1.36Ω to 1.66Ω, which in turn may be interpreted as an application of force, corresponding to the strain that might also result in a ±0.15Ω of resistance.

Figure 6:
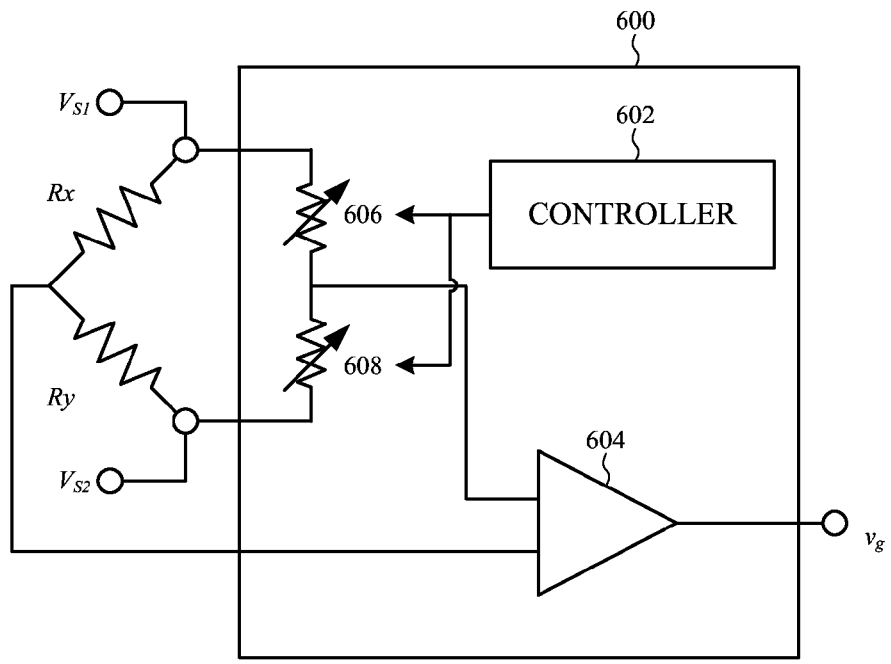
FIG. 6 depicts a simplified schematic diagram of a system for measuring a resistive sensor.

FIG. 6 depicts a simplified schematic diagram of a system for measuring a resistive sensor. The system can include an integrated circuit 600, which itself includes a controller 602, a programmable gain amplifier 604, and two digitally-controllable resistors 606, 608. The integrated circuit 600 can be coupled to a pair of resistive strain sensors Rx and Ry to form a Wheatstone bridge configuration between the resistive strain sensors and the two digitally-controllable resistors 606, 608. Prior to measuring any differential or common properties of the Wheatstone bridge, the controller 602 can be calibrated to match the resistances of each of the pair of resistive strain sensors Rx and Ry. For example, the digitally-controlled resistor 606 can be matched to Rx and the digitally-controlled resistor 608 can be matched to the second of the two resistive strain sensors.

The matching of the digitally-controlled resistors to the resistive strain sensors can be accomplished in a variety of ways. For example, in one embodiment, the controller 602 can adjust each of the digitally-controlled resistors in small steps until the voltage measured across the bridge is functionally zero. In many embodiments, this calibration process can occur upon a determination that no strain is being applied to either of the resistive strain sensors Rx or Ry.

Once the digitally-controlled resistors 606, 608 within the integrated circuit 600 match to the values of the pair of resistive strain sensors Rx and Ry, any effects of manufacturing differences within the resistive strain sensors Rx and Ry are functionally offset. More particularly, any effects of manufacturing differences are balanced out when the respective digitally-controlled resistor 606, 608 is matched to the mis-manufactured sensor.

In many examples, the integrated circuit 600 such as described herein can include at least two digitally-controlled resistors 606, 608 that are physically arranged as physically adjacent selectable sets of high-precision resistors in order to provide a selectable range sufficient to match to the resistive strain sensors Rx and Ry. For example, each digitally-controlled resistor 606, 608 can be constructed based, at least in part, on the manufacturing tolerances expected of the process used to form the resistive strain sensors Rx and Ry. For example, if the resistive strain sensors Rx and Ry can only be manufactured within a tolerance of 0.5%, each digitally-controlled resistor 606, 608 can be configured to provide a range including at least 1.0% of the total expected resistance.

Figure 7:
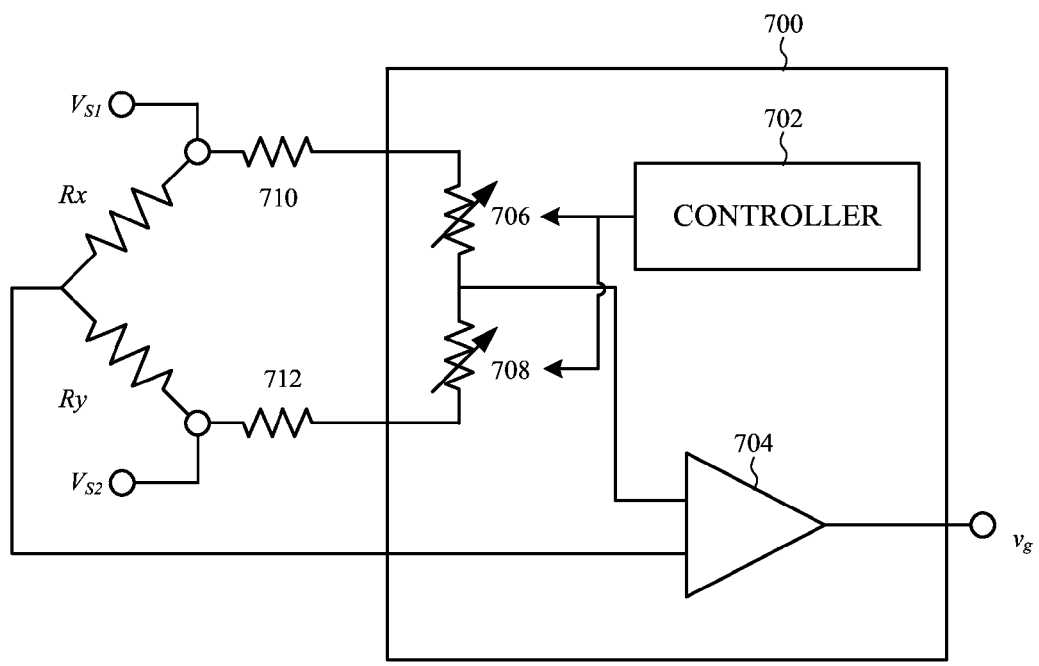
FIG. 7 depicts another simplified schematic diagram of a system for measuring a resistive sensor.

In other embodiments, either or both digitally-controlled resistors can be used in series with an off-chip high precision resistor that provides the bulk of the resistance for matching to a resistive strain sensor, such as depicted in FIG. 7. For example, an off-chip bulk resistor 710, 712 can be 40Ω, and the on-chip digitally-controllable resistor can provide 5 to 15Ω of resistance, for a total series resistance of 45Ω to 55Ω. In some embodiments, an off-chip bulk resistor may be favored over an entirely integrated circuit embodiment. For example, an off-chip bulk resistor 710, 712 of high-precision resistor may be less expensive to manufacture.

Figure 8A:
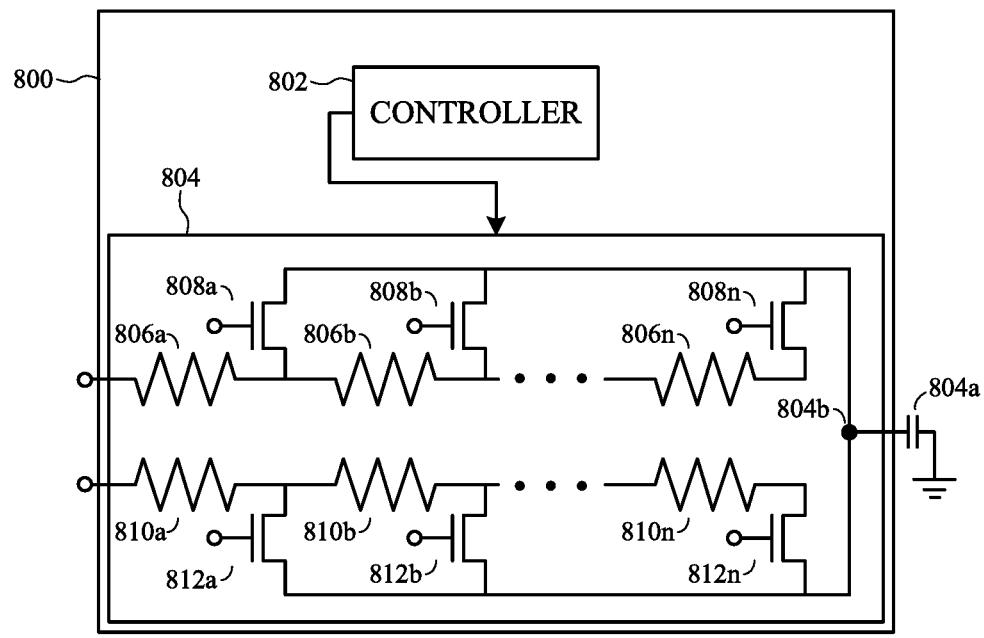
FIG. 8A depicts another simplified schematic diagram of a system for measuring a resistive sensor.

As noted above, in many embodiments, a digitally-controlled resistor can be formed within the integrated circuit as a resistor ladder, for example as illustrated in FIG. 8A. In this embodiment, the integrated circuit 800 can include a digitally-controlled resistor 804 that can include a first resistor ladder 806 that can include a number of high-precision resistors 806a-806n that each are coupled to a digital switch 808a such as a transistor. The digitally-controlled resistor 804 can also include a second resistor ladder 810 that can include a number of high-precision resistors 810a-810n that each are coupled to a respective digital switch 812b such as a transistor.

In some embodiments, the high-precision resistors can be arranged in series, for example as shown. In other embodiments, the high-precision resistors can be arranged in parallel. In still further embodiments, another arrangement of the high precision resistors can be used.

In many examples, and as illustrated, the digitally-controlled resistors are physically arranged as adjacent pairs of high-precision resistors. In this manner, each digitally-controlled resistor shares thermal properties with adjacent digitally-controlled resistors. For example, high-precision resistor 806a may be located physically close to high-precision resistor 810a. In this manner, complementary resistors of each digitally controlled resistor may be at substantially the same temperature, due to their close physical proximity. As noted above, this may reduce or eliminate any effects of temperature gradients within the integrated circuit.

The integrated circuit can also be coupled to a filter capacitor 804a at the midpoint 804b of the Wheatstone bridge configuration. The filter capacitor 804a can be coupled to ground and may be included to filter high frequency noise.

Figure 8B:
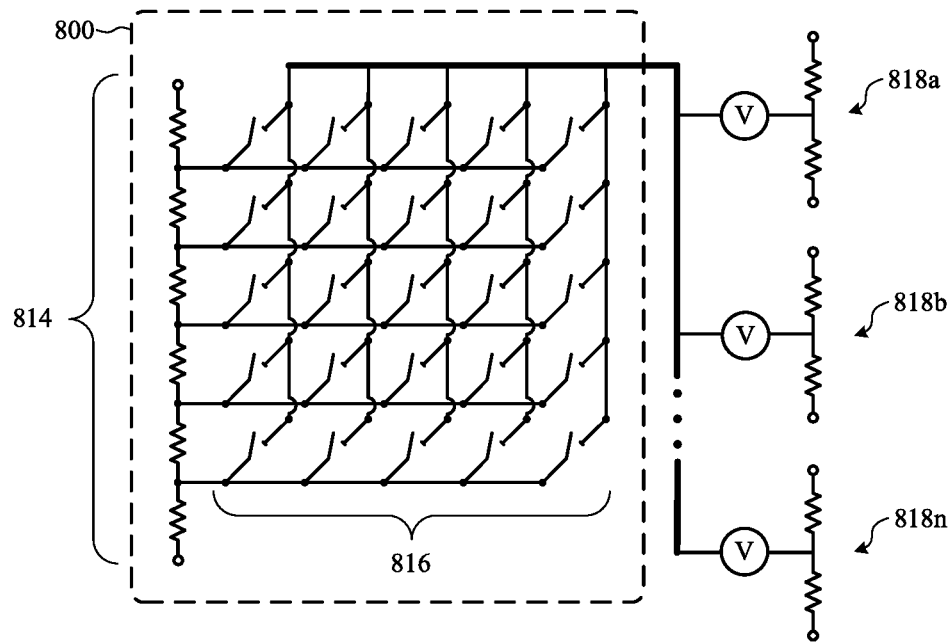
FIG. 8B depicts another simplified schematic diagram of a system for measuring a resistive sensor.

FIG. 8B depicts another simplified schematic diagram of a system for measuring a resistive sensor. In this embodiment, the integrated circuit 800 includes a resistor ladder 814. The resistor ladder 814 is shown as a series-coupled set of five individual resistors, although such a configuration is not required. For example, in other embodiments, a greater number or a fewer number of resistors are used. In many embodiments, one terminal of the resistor ladder 814 (e.g., upper terminal as illustrated) can be coupled to a positive reference voltage and a second terminal of the resistor ladder (e.g., lower terminal as illustrated) can be coupled to a negative reference voltage.

Each resistor of the resistor ladder 814 is coupled to neighboring resistors at a junction referred to herein as a tap. Each tap is coupled to one or more switches of a switch array 816. As shown, the switch array 816 can be implemented as a series of rows and columns. A series of switches (e.g., MOSFET, TFT, or other transistor or mechanical switch) couples each row to each column. As illustrated, the switch array 816 includes twenty five independent switches connecting five rows to five columns, although such a configuration is not required and other numbers of rows, columns and switches can be used.

The switch array 816 can be associated with one or more pairs of resistive sensors, illustrated in FIG. 8B as the resistive sensor pairs 818a, 818b, 818n. In many embodiments, one terminal of the resistive sensor pairs 818a, 818b, 818n (e.g., upper terminals as illustrated) can be coupled to a positive reference voltage and a second terminal of the resistive sensor pairs 818a, 818b, 818n (e.g., lower terminals as illustrated) can be coupled to a negative reference voltage. In many embodiments, the reference voltages connected to the resistive sensor pairs 818a, 818b, 818n can be the same as the reference voltages connected to the resistor ladder 814.

As with other embodiments described herein, the resistive sensor pairs can be configured in a voltage divider topology. In this configuration, closure of a switch within the switch array 816 can form an electrical circuit between a portion of the resistor ladder 814 and one or more of the resistive sensor pairs 818a, 818b, 818n such that a voltage can be read. More specifically, closure of a switch within the switch array 816 can form a Wheatstone bridge configuration. By varying which one or more of the resistive sensor pairs are enabled, the integrated circuit 800 can balance the Wheatstone bridge (either proportionally or directly). Once balanced, the particular switch or switches selected by the integrated circuit 800 (or another processor or controller coupled to the integrated circuit 800) can be saved for future reference.

Figure 9:
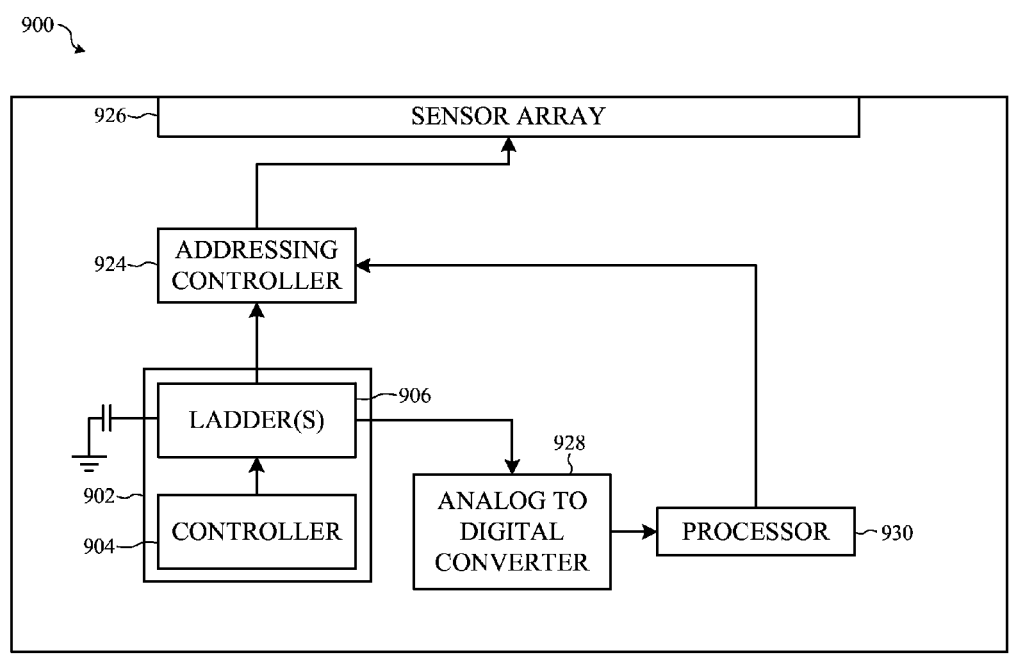
FIG. 9 depicts a simplified schematic diagram of an electronic device incorporating a resistive sensor array and a system for measuring the same.

FIG. 9 depicts a simplified schematic diagram of an electronic device 900 incorporating a resistive sensor array and a system for measuring the same. As with other embodiments described herein (see, e.g., FIG. 1), the electronic device 900 can include a memory, power supply and/or battery, network connections, sensors, input/output ports, acoustic elements, haptic elements, digital and/or analog circuits for performing and/or coordinating tasks of the electronic device 900, and so on.

The electronic device 900 can include a resistive sensor array 926 that can include a number of independent resistive sensor elements arranged in a grid, matrix, array, or other pattern. The resistive sensor array 926 can be coupled to an addressing controller 924 that can independent couple to each independent resistive sensor within the resistive sensor array 926. In one embodiment, the addressing controller 924 can be coupled to a number of circuit traces arranged as a plurality of rows and a plurality of columns, with each intersection point of the rows and columns corresponding to one resistive sensor of the resistive sensor array. By activating a particular row and a particular column, the addressing controller 924 can select a single resistive sensor of the plurality of resistive sensors 926. In certain embodiments, more than one sensor can be selected at a time.

The electronic device 900 can also include an integrated circuit 902, which itself can contain one or more digitally variable resistors arranged as resistor ladders 906. The resistance of the resistor ladders 906 can be selected by a controller 904 also included within the integrated circuit 902.

In other embodiments, the resistor ladders 906 can be controlled by a controller that is external to the integrated circuit 902.

In other embodiments, the resistor ladders 906 can be coupled to a high-precision off-chip bulk resistor. In still further embodiments, the resistor ladders 906 can be coupled to more than one high-precision off-chip bulk resistor.

As noted with respect to other embodiments described herein the resistor ladders 906 within the integrated circuit 902 can be coupled to one or more resistive sensors within the sensor array 926 in order to obtain a resistive measurement from the selected sensor. In the illustrated embodiment, the addressing controller 924 can perform and/or coordinate the connection of individual resistive sensors of the sensor array 926 to the resistor ladders within the integrated circuit 902. Once coupled to a sensor, the controller 904 of the integrated circuit 902 can calibrate the resistor ladders 906 so as to balance the Wheatstone bridge formed between the sensors and the resistor ladders.

Once calibrated to a particular resistive sensor, the integrated circuit 902 can interpret any changes in the resistance of the resistive sensor as the result of a change in the property which the sensor measures. For example, in many embodiments, the integrated circuit 902 can interpret changes in the resistance of the resistive sensor to be the result of strain applied to the sensor, which, in turn, may correspond to a force applied to the electronic device 900.

As noted with respect to other embodiments described here, the integrated circuit 902 can output a voltage that may vary with the resistance of the resistor of the sensor array to which the integrated circuit 902 is coupled. In many examples, the integrated circuit 902 can pass this voltage through an analog to digital converter 928 which can convert the voltage to a numerical value. This numerical value can thereafter be passed to a processor 930 for further calculations such as, but not limited to, conversion of the voltage value to a strain magnitude and/or a magnitude of force applied to the electronic device 900.

Figure 10:
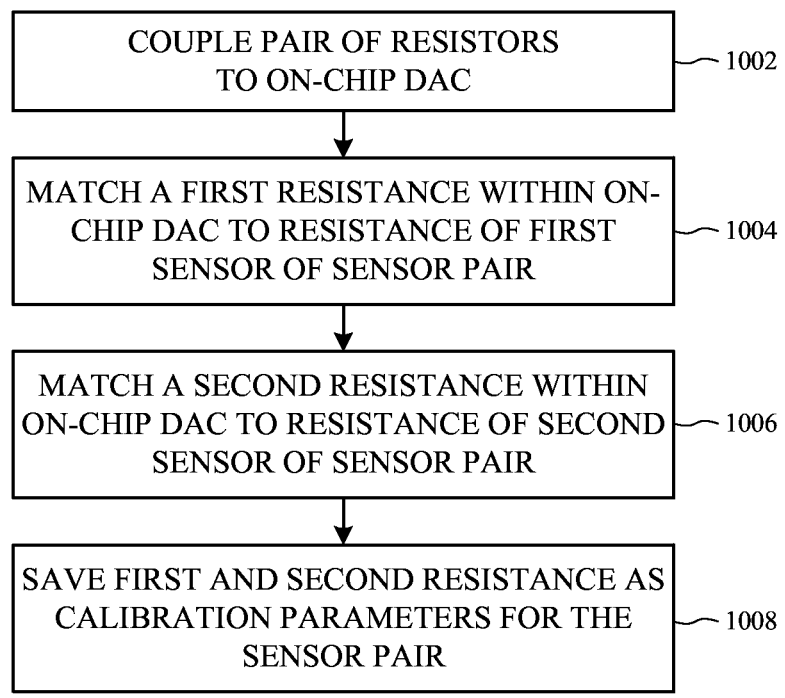
FIG. 10 is a process follow diagram illustrating example operations of a method of calibrating a system for measuring a resistive sensor.

FIG. 10 is a process follow diagram illustrating example operations of a method of calibrating a system for measuring a resistive sensor. The method can begin at operation 1002 during which a pair of resistive sensors can be coupled to an on-chip digital-to-analog converter ("DAC"). The DAC can be configured to provide a digitally-variable resistance. Next at operation 1004, a first digitally-variable resistance within the on-chip DAC can be matched to the resistance of one of the two resistors within the pair. Next, at operation 1006, a second digitally-variable resistance within the DAC can be matched to the resistance of the second resistor within the pair Finally, at operation 1008, the values captured in operations 1006 and 1006 can be saved as calibration parameters.

Figure 11:
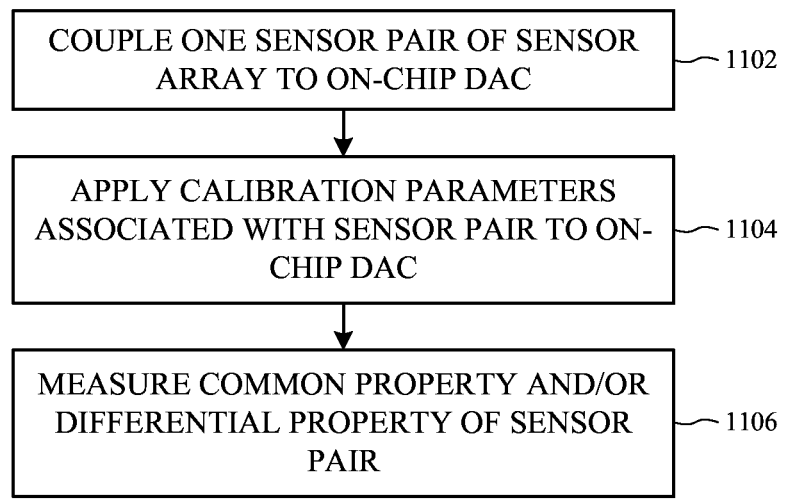
FIG. 11 is a process follow diagram illustrating example operations of a method of operating a system for measuring a resistive sensor.

FIG. 11 is a process follow diagram illustrating example operations of a method of operating a system for measuring a resistive sensor. The method can begin at operation 1102 in which a one sensor pair of an array of sensors can be coupled to an on-chip DAC. Next, at operation 1004, previously-stored calibration parameters can be applied to the on-chip DAC. For example, one or more digitally-variable resistance within the on-chip DAC can be set to particular values defined by the calibration parameters Finally, at operation 1106, a common property and/or a differential property of the sensor pair can be measured using the on-chip DAC.

Figure 12:
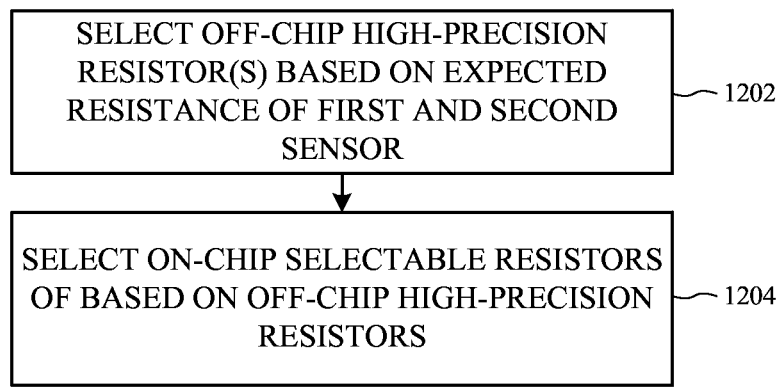
FIG. 12 is a process follow diagram illustrating example operations of a method of manufacturing a system for measuring a resistive sensor.

FIG. 12 is a process follow diagram illustrating example operations of a method of manufacturing a system for measuring a resistive sensor. The method can begin at operation 1202 during which an off-chip resistor can be selected based on an expected resistance of a first and second resistor. For example, the first and second resistors can be resistive strain sensors having a known manufacturing tolerance. Next, at operation 1204, the resistance of on-chip selectable resistors can be set based, at least in part, on the determined resistance of the off-chip high precision resistors.

Although many embodiments are described with reference to a force input sensor within a portable electronic device, it should be appreciated that other embodiments can take other forms and may be included within different form factors.

For example, embodiments described herein are not necessarily limited to measuring resistive sensors or strain sensors, and other sensors and other sensor types can be accurately measured using the systems and method described herein. Accordingly, it should be appreciated that the various embodiments described herein, as well as the functionality, operation, components, and capabilities thereof may be combined with other elements as necessary, and so any physical, functional, or operational discussion of an element or feature is not intended to be limited solely to that particular embodiment to the exclusion of others.

Furthermore, one may appreciate that although many embodiments are disclosed above, that the operations and steps presented with respect to methods and techniques described herein are meant as exemplary and accordingly are not exhaustive. One may further appreciate that alternate step order or, fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. An electronic device comprising:
    a substrate comprising:
        a top surface; and
        a bottom surface;
    a first resistive sensor coupled to the top surface and formed from a material with a strain-sensitive electrical property;
    a second resistive sensor coupled to the bottom surface, positioned opposite the first resistive sensor and aligned with the first resistive sensor, and formed from a material sharing a thermal property with the material of the first resistive sensor;
    an integrated circuit comprising:
        a first digitally variable resistor; and
        a second digitally variable resistor positioned adjacent to the first digitally variable resistor within the integrated circuit;
    an addressing controller to couple the first resistive sensor, second resistive sensor, the first digitally variable resistor, and the second digitally variable resistor into a balancing network configuration; and
    a calibration controller to balance the balancing network.

2. The electronic device of claim 1, wherein the thermal property shared by the first digitally variable resistor and the second digitally variable resistor is temperature.

3. The electronic device of claim 1, further comprising a processor coupled to the balancing network and configured to obtain both a differential property measurement and a common property measurement of the balancing network.

4. The electronic device of claim 3, wherein the processor obtains the differential property measurement and common property measurement of the balancing network substantially simultaneously.

5. The electronic device of claim 1, wherein the first and second resistive sensors are formed from the group consisting of carbon nanotubes, graphene, and indium tin oxide.

6. The electronic device of claim 1, wherein the substrate is formed from a rigid material.

7. The electronic device of claim 6, wherein the substrate is formed from a material from the group consisting of sapphire and glass.

8. The electronic device of claim 1, wherein the substrate is formed from a thermally conductive and mechanically rigid material.

9. The electronic device of claim 1, wherein the substrate and the first and second resistive sensors are each formed from an optically transparent material.

10. The electronic device of claim 1, wherein the first and second resistive sensors are formed from a piezoresistive material.

11. The electronic device of claim 1, wherein the first digitally variable resistor is positioned physically proximate the second digitally variable resistor within an integrated circuit such that a temperature of the first digitally variable resistor may be substantial equal to a temperature of the second digitally variable resistor.

12. The electronic device of claim 1, wherein integrated circuit is separated from the substrate.

13. An electronic device comprising:
a thermally-conductive substrate comprising:
   a first surface; and
   a second surface opposite the first surface;
a resistive sensor pair comprising:
   a first resistive sensor disposed on the first surface; and
   a second resistive sensor disposed on the second surface and aligned with the first resistive sensor;
an integrated circuit enclosing:
   a first digitally-variable resistor; and
   a second digitally-variable resistor;
a calibration controller in signal communication with the resistive sensor pair and the integrated circuit; wherein the resistive sensor pair and the first and second digitally-variable resistor are arranged in a balancing network; and
the calibration controller is configured to measure a voltage between a first node and a second node of the balancing network.

14. The electronic device of claim 13, wherein the first digitally-variable resistor comprises an arrangement of selectable resistors.

15. The electronic device of claim 13, wherein the integrated circuit is arranged such that the first digitally-variable resistor and the second digitally-variable resistor are disposed adjacent to one another.

16. The electronic device of claim 13, wherein the resistive sensor pair comprises carbon nanotubes, graphene, or indium tin oxide.

17. The electronic device of claim 13, wherein the substrate is formed from a rigid material.

18. The electronic device of claim 17, wherein the substrate is formed from a material from the group consisting of sapphire and glass.

* * * * *